C. WINTER.
SEAL FEED FOR BOTTLE SEALING MACHINES.
APPLICATION FILED FEB. 21, 1910.
1,141,165.
Patented June 1, 1915.
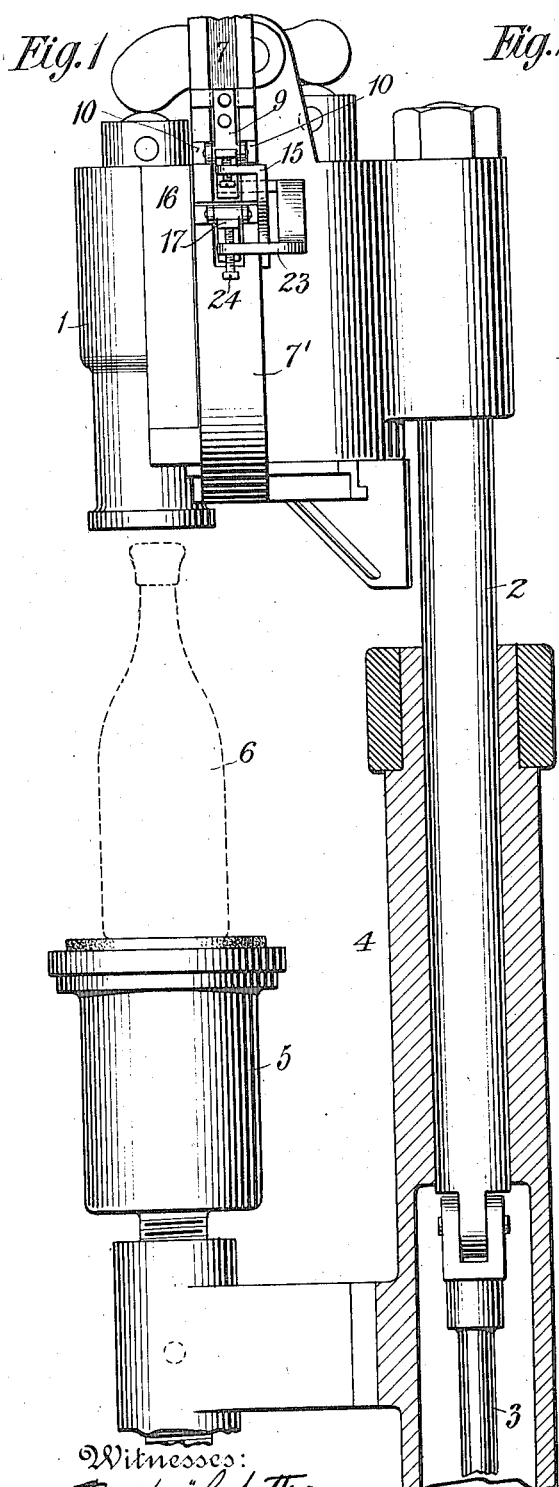
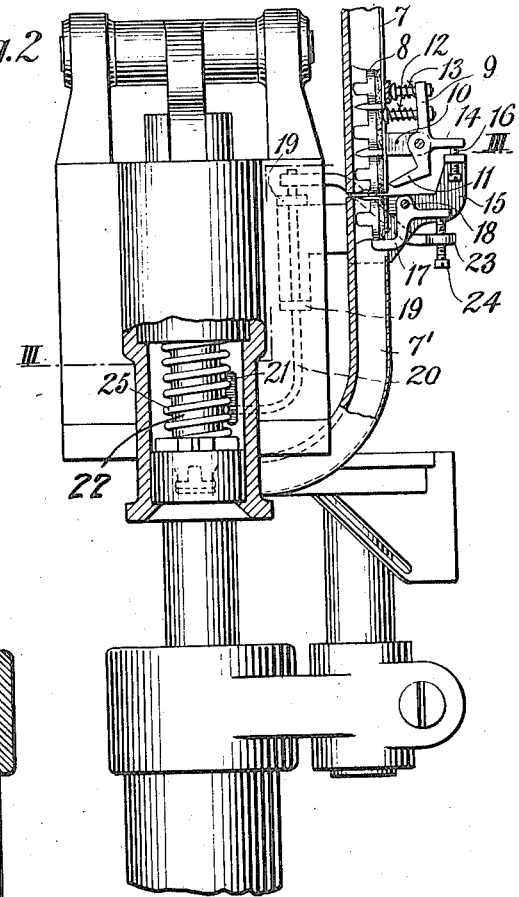
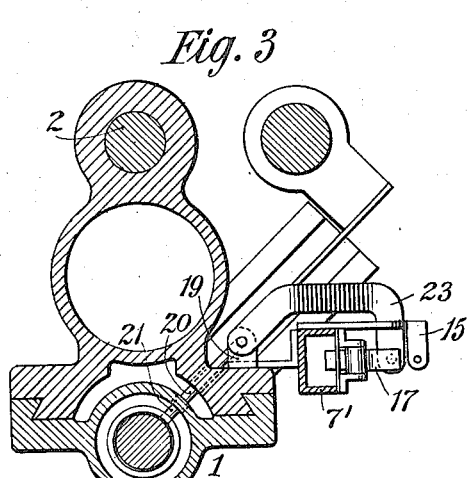
Witnesses:
Raphael Netter
Olive B. King
Charles Winter Inventor
By his Attorney
Hillary C. Messimer

UNITED STATES PATENT OFFICE.

CHARLES WINTER, OF WOODBURY, NEW JERSEY, ASSIGNOR TO STAR SEAL COMPANY, A CORPORATION OF NEW YORK.

SEAL-FEED FOR BOTTLE-SEALING MACHINES.

1,141,165.  Specification of Letters Patent.  Patented June 1, 1915.

Application filed February 21, 1910. Serial No. 544,988.

*To all whom it may concern:*

Be it known that I, CHARLES WINTER, a citizen of the United States, residing in Woodbury, county of Gloucester, State of New Jersey, have invented certain new and useful Improvements in Seal-Feeds for Bottle-Sealing Machines, of which the following is a specification.

This invention relates to a safety device for use with automatic seal feeds of bottle seal applying machines, and is designed to prevent the introduction of a seal into the seal holder or chuck in the sealing head while the chuck contains a seal.

My invention is particularly adapted for use with the seal feed or my co-pending application Serial No. 498,282, but it may be applied to other forms of seal feed and other constructions of sealing head without departing from the spirit of my invention.

In the accompanying drawings, Figure 1 is a side elevation of the parts of a sealing machine to which my improvement is applied; Fig. 2 is a front elevation thereof partly in section; and Fig. 3 is a horizontal section on the line III—III of Fig. 2.

1 is the sealing head containing the mechanism for applying the seal to the bottle, and into which the seal is to be automatically fed. The head 1 is fixed on the rod 2, which is pivotally connected to the link 3 leading to mechanism (not shown) for producing a reciprocation of the rod 2 when desired. On the frame 4, in which the rod reciprocates, there is mounted a bottle seat 5 in line with the sealing head 1 and designed to support the bottle 6 during the sealing operation. These are the main working parts of a machine of this character, and in many types the seals may be fed into the sealing head by hand, but in some cases, particularly where the bottles are fed automatically, it is desirable to automatically introduce a seal into the head on each sealing stroke thereof. The difficulty with this is that it sometimes happens that there is no bottle in place when the sealing stroke is made, and therefore a new seal is fed into the head although the one already in place has not been removed by the bottle.

It has been suggested to automatically eject the positioned seal when the bottle is not in place, but this is objectionable because the seals thus ejected must be collected and again passed through the separator, and therefore I prefer to feed a seal into the head only when the positioned seal has been removed by the bottle.

I accomplish this object by means which are independent of the apparatus for separating and individualizing the seals and feeding them into the head, as it is all accomplished in the runway from the separator to the feeder, and therefore I have not illustrated the details of these parts, but refer to my said co-pending application for information as to one form thereof.

7 is the runway from the separator down which the seals 8, 8 travel by gravity. At a point near the sealing head I break this runway and attach the lower part 7' to the reciprocating sealing head, while the upper part 7 is attached to the stationary separator. At the mouth of the runway 7 I provide a compound stop, consisting of a rod 9 pivotally mounted on a bracket 10 fixed on the runway 7. At its lower end this rod 9 carries a fixed finger 11, and at its upper end a spring pressed finger 12, adapted to pass through a slot in the side of the runway and bear against a seal, and preferably a second spring pressed finger 13 adapted to bear against the side of the runway above the slot.

A trip 14 at the pivoted point is adapted to be raised at the upper end of the stroke of the sealing head by a bracket 15 having the adjustable screw 16. When the trip 14 is raised the spring finger 12 bears against the second seal in the runway 7 and the spring finger 13 is bearing against the side of the runway, but fixed finger 11 is held away from the bottom seal in the runway 7 so that it is free to fall into the top of the runway 7' if that space is not already occupied. When the trip is released, the springs on the fingers 12 and 13 will force the finger 11 into the slot in the side of the runway 7, and if there is a seal at the mouth of the runway 7 the finger 11 will bear against and prevent it from dropping out, and at the same time the spring finger 12 will bear against the second seal in the column. If, however, there is no seal at the mouth of the runway 7, the fixed finger 11 will pass on into the runway 7 and the spring on the finger 13 will force the finger 12 out of contact with the seal, and the whole column will drop down upon and be supported by the finger 11. In this way a seal is placed in the upper end of the runway 7' on each up stroke unless this space is already occupied.

The seal at the top of the movable portion of the runway is normally held in position by the stop 17 pivoted on the pin 18 on the runway 7'.

Mounted in guides 19 on the sealing head is a rod 20 with its lower end projecting inside the head, through a slot 21, above the seal holder 22. At its other end this rod 20 carries a tripper 23 adapted to move the stop 17, and having an adjustable screw 24. When the sealing head moves down over the bottle the seal holder or chuck is moved up in the head against the spring 25, and this movement of the chuck releases the seal at the top of the runway 7', but if there is no bottle in position, the chuck is not moved and consequently no seal is released.

The operation of my invention is as follows: With the parts in the position shown in Fig. 2, and a seal in the seal holder, as shown in dotted lines, a bottle is placed under the sealing head and the latter started in motion. The early downward movement of the sealing head carries the runway 7' away from the runway 7, and with it the bracket 15, so that the finger 11 is forced against the lower seal in the runway 7, so as to prevent it from falling out. Continued movement of the sealing head brings the seal holder down on top of the bottle, so that it is forced up into the sealing head. As the seal holder is forced into the sealing head, it raises the rod 20 and the tripper 23, so as to operate the stop 17 and release the seal in the top of the runway 7'. This seal falls down through the runway into position to be forced into the chuck on the up stroke of the sealing head in place of the seal which is now in that position. Continued downward movement of the sealing head applies the seal to the bottle, after which the head commences its upward movement. Toward the end of the up stroke the seal, which has dropped to the bottom of the runway 7', is pushed into the now empty seal chuck, and at about the same time the stop 17 returns to its normal position so as to hold up the seal. At the end of the up stroke of the sealing head the trip 14 is operated so that the finger 11 is drawn out of the runway 7 and out of contact with the bottom seal in that runway, while the second seal in the runway is held in position by the spring finger 12. This allows the bottom seal to drop into the now empty mouth of the runway 7'. If now a complete movement of the sealing head is made without a bottle in position, the seal which has just been placed in the seal holder will not be removed because there is no bottle in position to receive it. Furthermore, the seal at the top of the runway 7' will not be released, because there is no bottle in position to move the seal holder. And finally, the seal at the bottom of the runway 7 will not fall into the runway 7' because the space is already occupied.

It will be observed, therefore, that broadly considered, my invention consists in controlling the supply of seals to the seal holder by means of the bottle, and that the details of the mechanism for performing this operation may be varied to a considerable extent without departing from the spirit of my invention.

Having described my invention, what I claim is:

1. In apparatus for automatically feeding seals to bottle seal applying machines, the combination of a sealing head, a movable seal holder therein, a seal runway having one portion stationary and the other portion movable with the sealing head, means operated by the movable seal holder for releasing a single seal from the movable portion of the runway, and means operated by the movement of the sealing head for releasing a single seal from the stationary portion of the runway.

2. In apparatus for automatically feeding seals to bottle seal applying machines, the combination of a sealing head, a movable seal holder therein, a seal runway having one portion stationary and the other portion movable with the sealing head, means operated by the movable seal holder for releasing a single seal from the movable portion of the runway on the down stroke of the sealing head, and means operated by the movement of the sealing head for releasing a single seal from the stationary portion of the runway on the up stroke of the sealing head.

3. In bottle seal applying machines, the combination of a reciprocating sealing head, a seal holder disposed therein to reciprocate therewith and to be movable relative thereto during a sealing operation, a seal runway, means operatively connected to the head for releasing a seal in said runway on the upward movement of the head, a stop operating in the runway to support the released seal, and means carried by said head and operatively connected to the seal holder to be operated upon the relative movement of the seal holder and head for moving the stop to release the seal.

4. In bottle seal applying machines, the combination of reciprocating sealing mechanism comprising parts having relative motion during a sealing operation, a stationary runway, a runway secured to reciprocate with one of the said sealing mechanism parts to bring it to and from the said stationary runway, mechanism in operable connection with another of said sealing mechanism parts to be operated by the said relative movement of said parts to effect a feeding of one seal to the sealing mechanism for each sealing operation, and means operated by the upward stroke of said sealing mechanism for feeding a seal from said stationary runway to said reciprocating runway.

5. In bottle seal applying machines, the combination of reciprocating sealing mechanism comprising parts having relative motion during a sealing operation, a stationary runway, a runway secured to reciprocate with one of the said sealing mechanism parts to bring it to and from the said stationary runway, mechanism in operable connection with the other of said sealing mechanism parts to be operated by the said relative movement of said parts to effect a feeding of one seal to the sealing mechanism for each sealing operation, a pair of stops one above the other operating within said stationary runway, and an arm moving upwardly with the upward stroke of said sealing mechanism to operate said stops to engage them intermittently with adjacent seals to permit the lowermost seal to escape to the lower runway and the column of seals to advance until the next seal is engaged by the lower stop.

6. In bottle seal applying machines, the combination of a reciprocating sealing head, a seal runway, seal feeding mechanism therein for said sealing head dependently operable upon the presence of a bottle in position to be sealed, other seal feeding mechanism above said first feeding mechanism for feeding seals to said first feeding mechanism, and means operatively connected to the sealing head for operating said second feeding mechanism upon the upward movement of the sealing head.

7. In bottle seal applying machines, the combination of reciprocating sealing mechanism comprising parts having relative motion during a sealing operation, a stationary runway, a runway secured to reciprocate with one of the said sealing mechanism parts to bring it to and from the said stationary runway, an automatically returnable seal supporting lever for said reciprocating runway, an arm secured to another of said sealing mechanism parts to operate said lever when there is relative motion between said sealing mechanism parts to pass a seal, a lever fulcrumed to said stationary runway, a lower arm on said lever adapted to engage the lowermost of a column of seals, a second arm above said lower arm, a pin through said second arm adapted to engage the second of said seals, a spring on said pin to retain it in spring pressed engagement with its seal, a second pin through said second arm a spring on said pin to automatically return said arms to bring said first arm in engagement with its seal and to release said first pin from engagement with its seal, an operating arm for said lever, and an arm secured to said reciprocating runway to raise said operating arm at the upper reciprocation to release said first arm from its seal to pass said seal to the reciprocating runway and to engage said first pin with its seal.

8. In combination with a closure feeding mechanism, of a closure-applying mechanism including a movable sealing-head-including member having thrustwise movement and having a closure feeding chute attached thereto, said chute and closure feeding mechanism having relative movement into and out of closure transferring proximity to each other, means for moving the closure-applying mechanism to effect said relative movement of the chute and closure feeding mechanism and means carried by said chute for normally restraining the feed of the closures, said means being movable with the chute, and mechanism actuated by the presence of a bottle in said sealing head including member to release said closure.

In witness whereof I have hereunto set my hand in the presence of two witnesses.

CHARLES WINTER.

Witnesses:
 VIRGINIA ANDREWS,
 DAVID O. WATKINS.